(12) United States Patent
Adams et al.

(10) Patent No.: US 10,754,714 B1
(45) Date of Patent: Aug. 25, 2020

(54) METHOD AND DEVICE FOR TAKING AN ACTION BASED ON UNAUTHORIZED PRESENCE OF A PERSON IN AREA

(71) Applicant: BlackBerry Limited, Waterloo (CA)

(72) Inventors: Neil Patrick Adams, Waterloo (CA); Edward Snow Willis, Ottawa (CA); David Brian Seel, Ottawa (CA); Melanie Arlene Barker, Kanata (CA); Andrew Kugler, Ottawa (CA); David Noel Vanden Heuvel, Ottawa (CA); Andrew Frank Young, Ottawa (CA)

(73) Assignee: BLACKBERRY LIMITED, Waterloo (CA)

( * ) Notice: Subject to any disclaimer, the term of this patent is extended or adjusted under 35 U.S.C. 154(b) by 0 days.

(21) Appl. No.: 16/400,338

(22) Filed: May 1, 2019

(51) Int. Cl.
| | |
|---|---|
| *G06F 9/54* | (2006.01) |
| *G06F 21/84* | (2013.01) |
| *G06F 21/32* | (2013.01) |
| *G10L 17/00* | (2013.01) |

(52) U.S. Cl.
CPC .............. *G06F 9/542* (2013.01); *G06F 21/32* (2013.01); *G06F 21/84* (2013.01); *G10L 17/00* (2013.01)

(58) Field of Classification Search
None
See application file for complete search history.

(56) References Cited

U.S. PATENT DOCUMENTS

| | | | |
|---|---|---|---|
| 9,324,322 B1 | 4/2016 | Torok et al. | |
| 10,091,464 B2 * | 10/2018 | Baxter | H04N 7/181 |
| 2016/0217638 A1 * | 7/2016 | Child | H04L 12/2803 |
| 2017/0134698 A1 * | 5/2017 | Mahar | H04N 7/181 |

OTHER PUBLICATIONS

Lau., et al., "Alexa, Are You Listening? Privacy Perceptions, Concerns and Privacy-seeking Behaviors with Smart Speakers," Proceedings of the ACM on Human-Computer Interaction, vol. 2, Article 102, Nov. 2018, 31 pages.

\* cited by examiner

*Primary Examiner* — Craig C Dorais
(74) *Attorney, Agent, or Firm* — Borden Ladner Gervais LLP; Jeffrey J. Coghlan

(57) ABSTRACT

Methods and devices are provided relating to taking an action in response to determining that a person who is present in the vicinity of the device, such as a smart speaker, is not authorized to be present. In an aspect, the electronic device receives the notification and a topic identifier associated with the notification. Information identifying persons located in the vicinity of the electronic device may be received. The device may then receive and/or determine information identifying at least one person located within the vicinity who is not authorized, based on the topic identifier, to be present in the vicinity when the notification is to be outputted. The device generates an output signal indicating receipt of the notification and that there is at least one person present in the vicinity who is not authorized to be present when the notification is to be outputted.

19 Claims, 9 Drawing Sheets

| Notification topic identifiers | Authorized persons |
|---|---|
| Health | Abe, Becky |
| Work | Cody, Dennis, Ernie, Frank, George, Hilary, Ina, Julie |
| Work – secret | Dennis, Frank |
| Work – project A | Cody, Dennis, Hilary |
| Top Secret | Frank, Kevin |
| Personal | user only |

FIG. 3A

| Notification topic identifiers | Authorized domains | Persons in domain |
|---|---|---|
| Health | Family | Abe, Becky |
| Work | Work Colleagues | Cody, Dennis, Ernie, Frank, George, Hilary, Ina, Julie |
| Work – secret | Work Colleagues with secret security clearance | Dennis, Frank |
| Work – project A | Work Colleagues working on a specific project | Cody, Dennis, Hilary |
| Personal | User only | user only |

FIG. 3B

| Person | Project(s) | Security Clearance |
|---|---|---|
| Allan | Alpha, Delta | confidential |
| Bob | Alpha, Beta | secret |
| Claire | Echo | confidential |
| Donna | Alpha, Beta, Foxtrot | top secret |

FIG. 8

| Project | Security Clearance |
|---|---|
| Alpha | confidential |
| Beta | secret |
| Delta | confidential |
| Echo | confidential |
| Foxtrot | top secret |

METHOD AND DEVICE FOR TAKING AN ACTION BASED ON UNAUTHORIZED PRESENCE OF A PERSON IN AREA

FIELD

The present disclosure generally relates to an electronic device, such as a smart speaker, taking an action in response to determining that a person who is present in the vicinity of the electronic device is not authorized to be present.

BACKGROUND

Electronic devices, such as smart speakers, can interact with one or more people in a room. Sometimes smart speakers may have or receive private or sensitive information that should only be provided to a user if they are alone or with a trusted group of people. In other words, such private or sensitive information is not be outputted in a way that it would be received by any nearby unauthorized persons. The sensitive information could be anything, such as a reminder of an appointment, meeting, or other event, or notifying and/or audibly outputting an email or text message.

For example, a person may not want an audible reminder of a meeting with another person to be outputted while certain other persons are in the room. For instance, a person may not want an audible reminder of a job interview when a coworker is in the room. Further, a person may not want an audible reminder of a doctor's appointment when anyone else is in the room. Further, a person may not want the smart speaker to read aloud an email message containing personal health information when anyone else is in the room.

In another scenario, a smart speaker is used to conduct or facilitate an event such as a meeting. Companies sometimes have sensitive or confidential information for which access and knowledge is managed on a need to know basis. The confidential information may relate to a particular project. In a meeting environment, however, particularly when meetings span sites, it can be difficult to ensure that everyone present in the meeting room(s) is authorized to be present to hear the proceedings, which may include confidential information. Furthermore, once confidential information has gone beyond the intended audience, it can be difficult to control its spread.

Improvements in protecting such information are desirable.

BRIEF DESCRIPTION OF THE DRAWINGS

Embodiments of the present disclosure will now be described, by way of example only, with reference to the attached Figures.

FIG. 3A is a table showing some example mappings between notification topic identifiers and persons authorized to hear notifications associated with the topic identifier.

FIG. 3B is a table showing some example mappings between notification topic identifiers, authorized domains, and persons in the domains.

FIG. 8 is a representation of an example data structure comprising mapping information of persons to projects and to security clearance levels.

FIG. 9 is a representation of an example data structure comprising mapping information of projects to security clearance levels.

DETAILED DESCRIPTION

Figure 1:
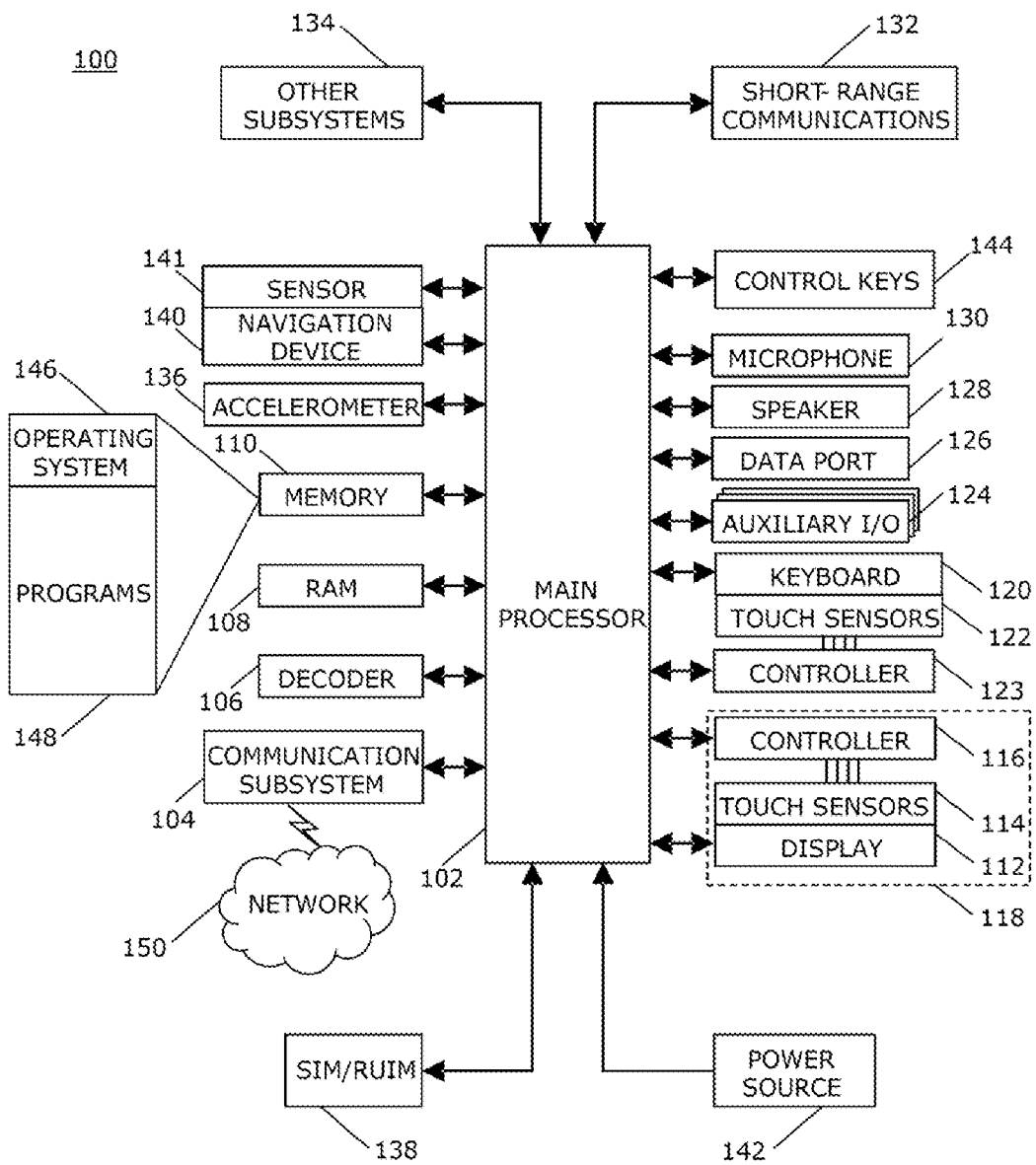
FIG. 1 is a block diagram of an electronic device in accordance with the present disclosure.

The present disclosure generally relates to an electronic device, such as a smart speaker, taking an action in response to determining that a person who is present in the vicinity of the electronic device is not authorized to be present.

In an aspect, the present disclosure generally relates to selectively outputting a notification or other information from an electronic device, for example audibly and/or visually, based on the persons present in the vicinity of the electronic device such, as a smart speaker. An electronic device may comprise a notification output device, such as a speaker or a display, for outputting a notification. The electronic device is configured to receive a notification to be outputted. A topic identifier associated with the notification may then be received. Information identifying persons located within the vicinity, such as a room, may be received. The electronic device may then receive and/or determine information identifying at least one person located in the vicinity who is not authorized, based on the topic identifier, to be present in the vicinity when the notification is to be outputted. The electronic device may then generate an output signal indicating receipt of the notification and that there is at least one person present in the vicinity who is not authorized to be present when the notification is to be outputted. In response to the signal, the electronic device may modify how the notification is delivered via the speaker, for example the notification may be revised (e.g. to remove information or to otherwise generalize the notification) prior to being outputted, the delivery of the notification may be postponed until a later time when there are no persons present in the vicinity who are not authorized to be present, or the audible delivery of the notification may be canceled.

According to an aspect, the present disclosure is directed to an electronic device comprising a memory storing computer-executable instructions, and a processor in communication with the memory, and configured to execute the computer-executable instructions to receive a notification to be audibly and/or visually outputted in a defined geographic area by the electronic device, the device also being located within the defined geographic area, receive a topic identifier associated with the content of the notification, receive information identifying one or more persons located within the defined geographic area, receive information identifying at least one person located within the defined geographic area who is not authorized, based on the topic identifier, to be present in the defined geographic area when the notification is to be outputted, and generate an output signal to the identified one or more persons located within the defined geographic area indicating receipt of the notification and that there is at least one person present in the defined geographic area who is not authorized to be present when the notification is to be outputted.

In an embodiment, the processor is further configured to, in response to the output signal indicating that there is at least one person present in the defined geographic area who is not authorized to be present when the notification is to be outputted, modify the manner in which the notification is to be outputted.

In an embodiment, the modifying involves postponing in time the outputting of the notification.

In an embodiment, the modifying involves postponing any outputting of the notification, and outputting the notification at a later time when it is determined that there are no persons present in the defined geographic area who are not authorized to be present.

In an embodiment, the modifying involves modifying the content of the notification, and outputting the modified notification.

In an embodiment, wherein the received topic identifier is based on a mapping of text content in the notification to a list of topic identifiers.

In an embodiment, the received information identifying the at least one person located within the defined geographic area who is not authorized to be present is based on a mapping of persons to authorized and/or unauthorized topic identifiers.

In an embodiment, the electronic device further comprises a microphone, wherein the processor is further configured to execute computer-executable instructions to receive a voice signal of a person via the microphone, receive, from a stored set of associations between persons and voice pattern information, information identifying the person based on the received voice signal, wherein the received information identifying the one or more persons located within the defined geographic area includes the information identifying the person based on the received voice signal.

In an embodiment, the processor is further configured to execute computer-executable instructions to obtain device information related to one or more devices located within the defined geographic area, and obtain, from a stored set of associations between persons and devices, information identifying one or more persons associated with the devices located in the defined geographic area based on the device information, wherein the received information identifying the one or more persons located within the defined geographic area includes the information identifying the one or more persons based on the device information.

According to an aspect, the present disclosure is directed to a method of selectively outputting a notification, from an electronic device, the method comprising receiving the notification to be audibly and/or visually outputted in a defined geographic area by the electronic device, the device also being located within the defined geographic area, receiving a topic identifier associated with the content of the notification, receiving information identifying one or more persons located within the defined geographic area, receiving information identifying at least one person located within the defined geographic area who is not authorized, based on the topic identifier, to be present in the defined geographic area when the notification is to be outputted, and generating an output signal to the identified one or more persons located within the defined geographic area indicating receipt of the notification and that there is at least one person present in the defined geographic area who is not authorized to be present when the notification is to be outputted.

In an embodiment, the method further comprises, in response to the output signal indicating that there is at least one person present in the defined geographic area who is not authorized to be present when the notification is to be outputted, modifying the manner in which the notification is to be outputted.

In an embodiment, the modifying involves postponing in time the outputting of the notification.

In an embodiment, the modifying involves postponing any outputting of the notification, and outputting the notification at a later time when it is determined that there are no persons present in the defined geographic area who are not authorized to be present.

In an embodiment, wherein the modifying involves modifying the content of the notification, and outputting the modified notification.

In an embodiment, the received topic identifier is based on a mapping of text content in the notification to a list of topic identifiers.

In an embodiment, the received information identifying the at least one person located within the defined geographic area who is not authorized to be present is based on a mapping of persons to authorized and/or unauthorized topic identifiers.

In an embodiment, the method further comprises receiving a voice signal of a person via a microphone, and receiving, from a stored set of associations between persons and voice pattern information, information identifying the person based on the received voice signal, wherein the received information identifying the one or more persons located within the defined geographic area includes the information identifying the person based on the received voice signal.

In an embodiment, the method further comprises obtaining device information related to one or more devices located within the defined geographic area, and obtaining, from a stored set of associations between persons and devices, information identifying one or more persons associated with the devices located in the defined geographic area based on the device information, wherein the received information identifying the one or more persons located within the defined geographic area includes the information identifying the one or more persons based on the device information.

According to an aspect, the present disclosure is directed to a non-transitory computer-readable medium having computer-readable instructions stored thereon, the computer-readable instructions executable by at least one processor of an electronic device to cause the performance of the operations in accordance with one or more of the methods in accordance with the present disclosure.

In another aspect, the present disclosure generally relates to methods and devices for detecting persons that are not authorized to be present during an event such as a meeting. An event may be conducted in the presence of an electronic device, such as a smart speaker. The smart speaker may be configured to detect or identify persons known to be present at the event that are actually not authorized to be present.

The smart speaker may determine a topic identifier (e.g. a topic of the event), such as a project identifier, associated with the event and determine, based on the topic identifier, that one or more persons present at the event are not authorized to be present. For example, the unauthorized persons may not be on the project or may not have the requisite security clearance level to attend. The smart speaker may output an audible and/or visual notification to indicate the unauthorized presence to the other event attendees.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The present disclosure, in an aspect, generally relates to an electronic device. An example of an electronic device is a smart speaker. Other non-limiting examples of electronic devices include mobile, or handheld, wireless communication devices such as cellular phones, cellular smart-phones, wireless organizers, personal digital assistants, computers, tablet computers, mobile internet devices, electronic navigation devices, and non-handheld and/or non-mobile devices, and so forth.

A block diagram of one example of an electronic device 100, which in the present example is a smart speaker, is shown in FIG. 1. The electronic device 100 includes multiple components, including a processor 102, such as an electronic or hardware processor, which controls the overall operation of the electronic device 100. Communication functions, including data and voice communications, are performed through a communication subsystem 104. Communications subsystems 104 may include any component or collection of components for enabling communications over one or more wired and wireless interfaces. Data received by the electronic device 100 may be decompressed and decrypted by a decoder 106. The communication subsystem 104 may receive messages from and send messages to a wireless network 150. The wireless network 150 may be any type of wireless network, including, but not limited to, data wireless networks, voice wireless networks, and networks that support voice and/or data communications. A power source 142, such as one or more rechargeable batteries or a port to an external power supply, may power the electronic device 100.

The processor 102 may interact with other components, such as a Random Access Memory (RAM) 108, memory 110, an auxiliary input/output (I/O) subsystem 124, a data port 126, a speaker 128, a microphone 130, short-range communications 132, and other device subsystems 134. The speaker 128 is utilized to output audible signals. In an embodiment, the processor 102 may interact with a touch-sensitive display 118 and/or a keyboard 120.

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

The keys of the keyboard 120 may include touch sensors 122 coupled to a controller 123 to detect touch input thereon. The controller may be a keyboard controller 123 as illustrated in FIG. 1. Alternatively, the keys of the keyboard 120 may be coupled to the controller 116 utilized to detect touches using the touch sensors 114 of the touch-sensitive display 118.

The processor 102 may also interact with control keys 144 and, optionally, a navigation device 140. The control keys 144 may include, for example, a send key, a menu key, an escape key, an end key, or any other suitable control keys. The navigation device 140 may be a touch-sensitive track pad, an optical joystick, or any other suitable navigation device to interface with a user to provide input. The navigation device 140 may be utilized, for example, to navigate or scroll through information on a display, control a cursor or other indicator, edit information, and so forth.

The processor 102 may also interact with a biometric sensor 141 for obtaining data to authenticate a user. The biometric sensor 141 may be a fingerprint sensor disposed on the navigation device for detecting a touch thereon and obtaining fingerprint data upon receipt of a touch on the navigation device. Other biometric sensors may also be successfully implemented. For example, an iris scanner or other suitable detector may be utilized for the purpose of authenticating a user.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a voice command or other voice signal, a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information, such a voice signals, into electrical signals for processing.

As indicated above, the biometric sensor 141 may be a fingerprint sensor disposed on the navigation device 140 for detecting a touch thereon and obtaining fingerprint data upon receipt of a touch on the navigation device. The fingerprint sensor may include a plurality of transmit and receive electrodes that are disposed in a grid pattern. The transmit electrodes are very closely spaced and receive electrodes are very closely spaced relative to the electrodes of the touch-sensitive display, for example, to provide a very fine grid pattern. The fine grid pattern provides very fine resolution suitable for identifying a fingerprint pattern and for detecting conductivity of ridges and valleys in a fingerprint.

Optionally, the navigation device 140 may be utilized to detect the presence of a finger on the biometric sensor 141 and, in response, the biometric sensor 141 may obtain fingerprint data for authentication purposes.

The processor 102 receives the biometric data from the sensor 141 and compares the biometric data to biometric data stored, for example, in memory 136 to authenticate a user. A match or at least partial match of the biometric data from the sensor 141 results in authentication. The biometric data may therefore be utilized, for example, to unlock the electronic device 100, to access applications, documents, or information on the electronic device 100, or for any other suitable purpose.

The communications subsystem 104, auxiliary input/output (I/O) subsystem 124, a data port 126, short-range communications 132, and other device subsystems 134 may implement interfaces including but not limited to USB, Ethernet, high-definition multimedia interface (HDMI), Firewire (e.g. IEEE 1394), Thunderbolt™, WiFi™ (e.g. IEEE 802.11), WiMAX (e.g. IEEE 802.16), Bluetooth™, or Near-field communications (NFC), as well as GPRS, UMTS, LTE, LTE-A, and dedicated short range communication (DSRC).

In addition, device 100 may include one or more of transmitters, receivers, and antenna elements (none are shown), for example in communication subsystem 104 and/or short-range communications module 132. In at least some embodiments, the electronic device may have geographic positioning functionality, for example to determine a geographical position of the electronic device or for receiving timing signals for time synchronization of the device with other systems. In at least some embodiments, the electronic device may be capable of receiving Global Positioning System (GPS) signals. Therefore in at least one embodiment, as shown in FIG. 1, the electronic device may comprise a GPS radio or receiver (not shown). However, other embodiments may comprise and use other subsystems or components for, for example, determining the geographical position of the electronic device or for receiving timing signals for time synchronization. In some embodiments, the electronic device may be configured to determine a geographic location using Wi-Fi.

The electronic device 100 of FIG. 1 is merely an example and is not meant to be limiting. Various embodiments may utilize some or all of the components shown or described. Some embodiments may use other components not shown or described but known to persons skilled in the art. Furthermore, a device may contain multiple instances of a component, such as multiple electronic devices, processors, memories, transmitters, receivers, etc. Various other options and configurations are contemplated.

A smart speaker, or electronic device, may interact with one or more persons in a defined geographic area such as a vicinity of an electronic device. Sometimes a smart speaker may have or receive private or sensitive information that should only be provided to a user audibly and/or visually if they are alone or with an authorized group of persons. The sensitive information may be anything, such as a reminder of an appointment, meeting, or other event, or notifying and/or audibly outputting an email or text message.

Figure 2A:
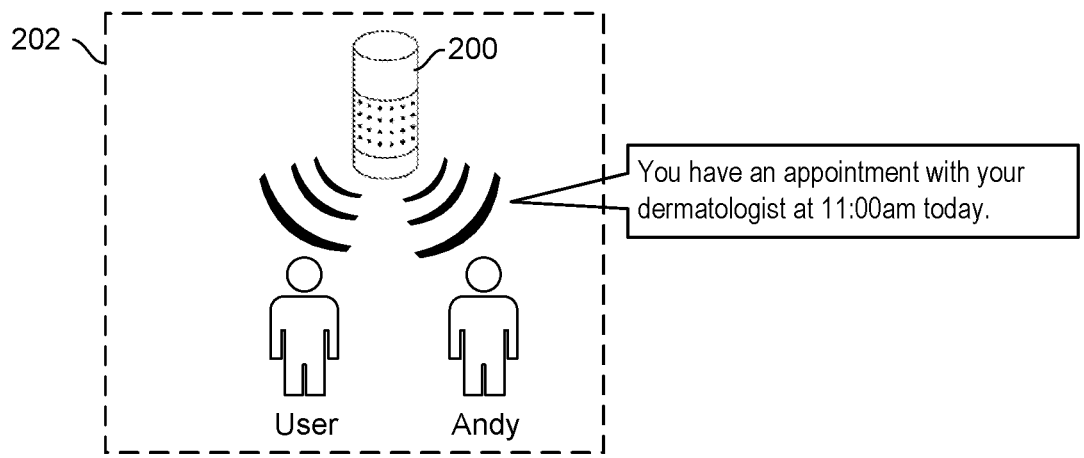
FIG. 2A is a diagram illustrating a scenario where a user associated with a smart speaker and another person are present in a defined geographic area proximate the smart speaker.

FIG. 2A is a diagram illustrating an example scenario where a user associated with a smart speaker 200 is present in a defined geographic area 202 surrounding the smart speaker. In this example, area 202 corresponds to the location and size of a room in a building. Area 202 as depicted is merely an example; its size and shape is arbitrary in the figure. Area 202 may be any suitable geographic area. In an embodiment, it may be based on the location and dimensions of a room. In an embodiment, it may be based on the capabilities of smart speaker 200. As shown, another person, Andy, is present in area 202. With limited or no control on when and/or how notifications or other information for the user are outputted from smart speaker 200, a notification may simply be outputted at the usual time. FIG. 2A shows an example audible message "You have an appointment with your dermatologist at 11:00 am today" being outputted from smart speaker 200 with limited or no regard to the fact that Andy is present. The user could be okay with Andy hearing this notification. In another situation, the user may not want the notification to be outputted when unauthorized persons, or anyone, is present in the room 202.

The present disclosure is not limited to the delivering or outputting of notifications, but rather covers the selective delivery or outputting of any type of information. In this sense, the term notification is generally used herein to refer to any type of information, and is thus not limited to only notices.

In at least some embodiments according to the present disclosure, the presence of the user may be a prerequisite for a notification being audibly and/or visually outputted. In other words, in some configurations, the notification may not be outputted audibly and/or visually unless the user is present in the defined area, regardless of who else may be present.

Figure 2B:
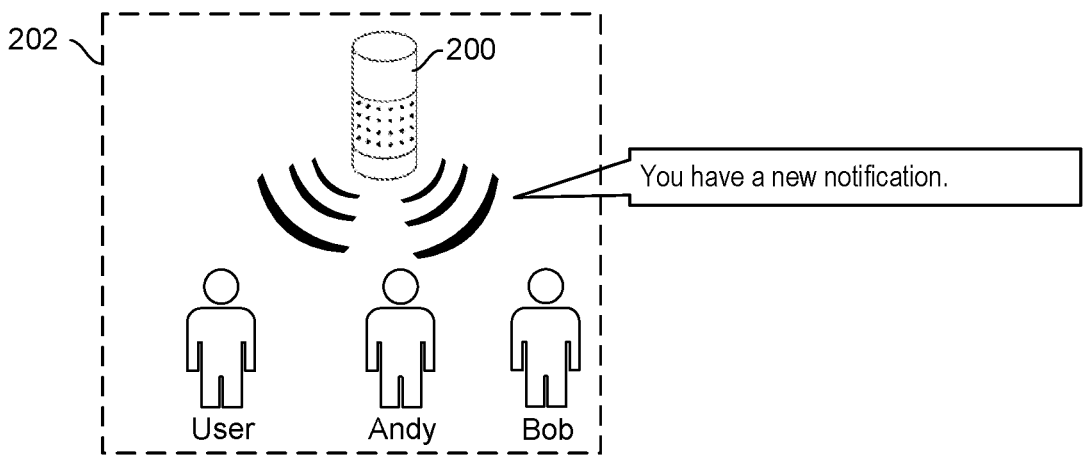
FIG. 2B is a diagram illustrating another scenario where a user and other persons are present in the defined geographic area.

FIG. 2B is a diagram illustrating another example scenario where a user and two persons, Andy and Bob, are present in the room 202. Here, the user is okay if Andy hears notifications but does not want Bob to hear any details of his/her notifications. Thus when Bob is present, speaker 200 is configured to output a modified version of the notification. In this example, the modified version is a mere audio message notifying the user that "You have a notification". This message simply indicates the receipt of a new notification by the smart speaker 200. The user may then decide how to proceed, for example waiting until Bob leaves to hear the full notification, or checking his/her mobile phone to read the full notification.

Figure 2C:
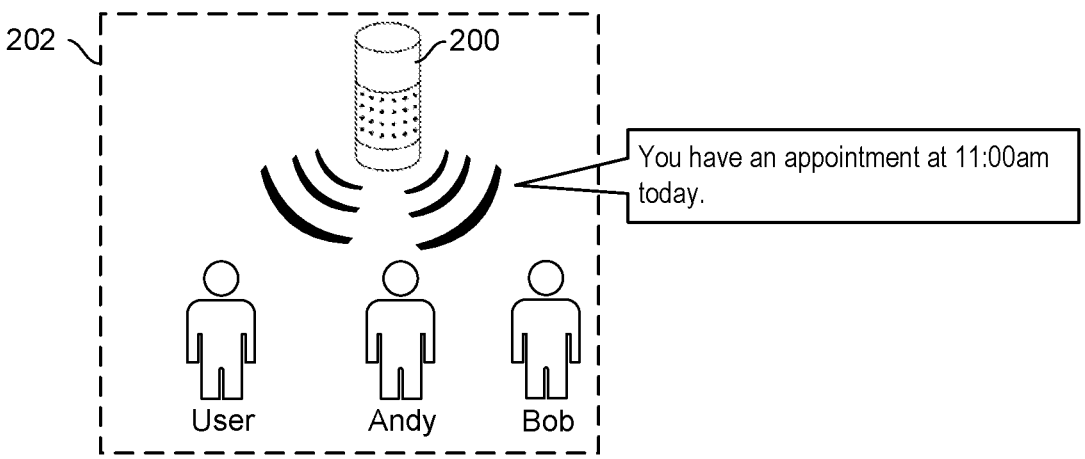
FIG. 2C is a diagram illustrating another scenario where a user and other persons are present in the defined geographic area.

FIG. 2C is a diagram illustrating another example scenario similar to the scenario of FIG. 2B. Here, speaker 200 is configured to output a modified version of the notification but here, the modified notification has more details compared to the example of FIG. 2B, namely "You have an appointment at 11:00 am today". Thus the notification informs the user that he/she has an appointment and the time of the appointment. However, it does not include the detail that the appointment is with a dermatologist. The examples in FIGS. 2B and 2C are generally premised on the ability of the speaker 200 to be aware of the presence of Andy, and Bob in the room 202.

In an embodiment, in order for a determination to be made on if, how, and/or when a notification is provided to a user, the system must be able to find out which person(s) are in the defined geographic area (e.g. room) and whether each person is authorized to be present for the specific notification topic. For example, if the user is at work and a notification arises relating to the user's health (e.g. a doctor's appointment), then perhaps no other person in the room would be authorized to be present to hear the notification. In another example, if the notification relates to a specific project at work, then perhaps some persons in the room on the project would be authorized to hear the notification while other persons in the room not on the project would not be authorized to hear the notification. Thus, the if, how, and/or when a notification is provided may be determined based on both the specifics of the notification (e.g. notification topic identifier) and on whether each person present is authorized to be present for the specific notification topic.

FIG. 3A is a table showing some example mappings between notification topic identifiers, or types, and persons authorized to hear notifications having the topic identifier. It may be assumed that, in at least some embodiments, the user is included as an authorized person for every notification topic identifier to be delivered to the user since the user is associated with the smart speaker or account. For instance, for the user, only Abe and Becky are authorized to be present to hear Health notifications. Work notifications having a security clearance level of "secret" may only be heard by Dennis and Frank. Work notifications related to a specific work project "A" are only to be heard by Cody, Dennis, and Hilary.

Although not shown, mapping information may include mappings between notification topic identifiers, or types, and persons who are not authorized to hear notifications having the topic identifier. Further, mapping information may be organized differently. For instance, information may be organized by person rather than topic. An example is "Person-Authorized Notification Topic Identifiers": "Dennis-Work, Work-secret, Work-project A".

FIG. 3B is another table showing some example mappings between notification topic identifiers, authorized domains, and persons in the domains. Persons in the domain are authorized to be present to hear notifications having the topic identifier. In this example, the authorization parameters for a domain may be set and adjusted, and persons may be simply added or removed from the domain.

Mappings between two or more of persons, notification topic identifiers, domains, may be generated in any suitable way or combination of ways. For example, mappings may be built by scraping of email and/or text messages. For instance, messages may be scraped to determine what topics are discussed amongst which persons. For example, one or more emails between Bob and Cody mention work project "ABC". It may be gleaned from this information that Cody should be authorized to be present for any notifications for Bob relating to work project "A", and vice versa.

Further, mappings may be built in a similar manner by scraping calendar or other invites. Further, mappings may be generated based on contact lists or directories, such as a Global Address List (GAL), meaning an electronic shared address book that typically contains all people in a given organization.

Further, mappings may be generated based on one or more previous discussions with persons in the presence of the smart speaker. For example, the user has a meeting with their doctor about a rash, and the user and their doctor are the only persons present. A mapping may be automatically generated between the doctor and a notification topic "Health" for the user.

Further, mappings may be generated based on user configuration. For example, a user could go through a setup wizard or other interface to choose which persons they authorize for which notification topics.

Further, mappings may be generated based on social media profiles of the user. For example, perhaps the user has previously set up a group of family members on a social networking platform or other platform.

Further, mappings may be generated based on learning from mistakes. For example, after a mistake has been made in divulging sensitive information, the user may provide an indication, such as by saying "that was private", and a new mapping can be added or an existing mapping may be modified.

The above techniques and other techniques may also be used to add/remove persons to/from domains.

Figure 4:
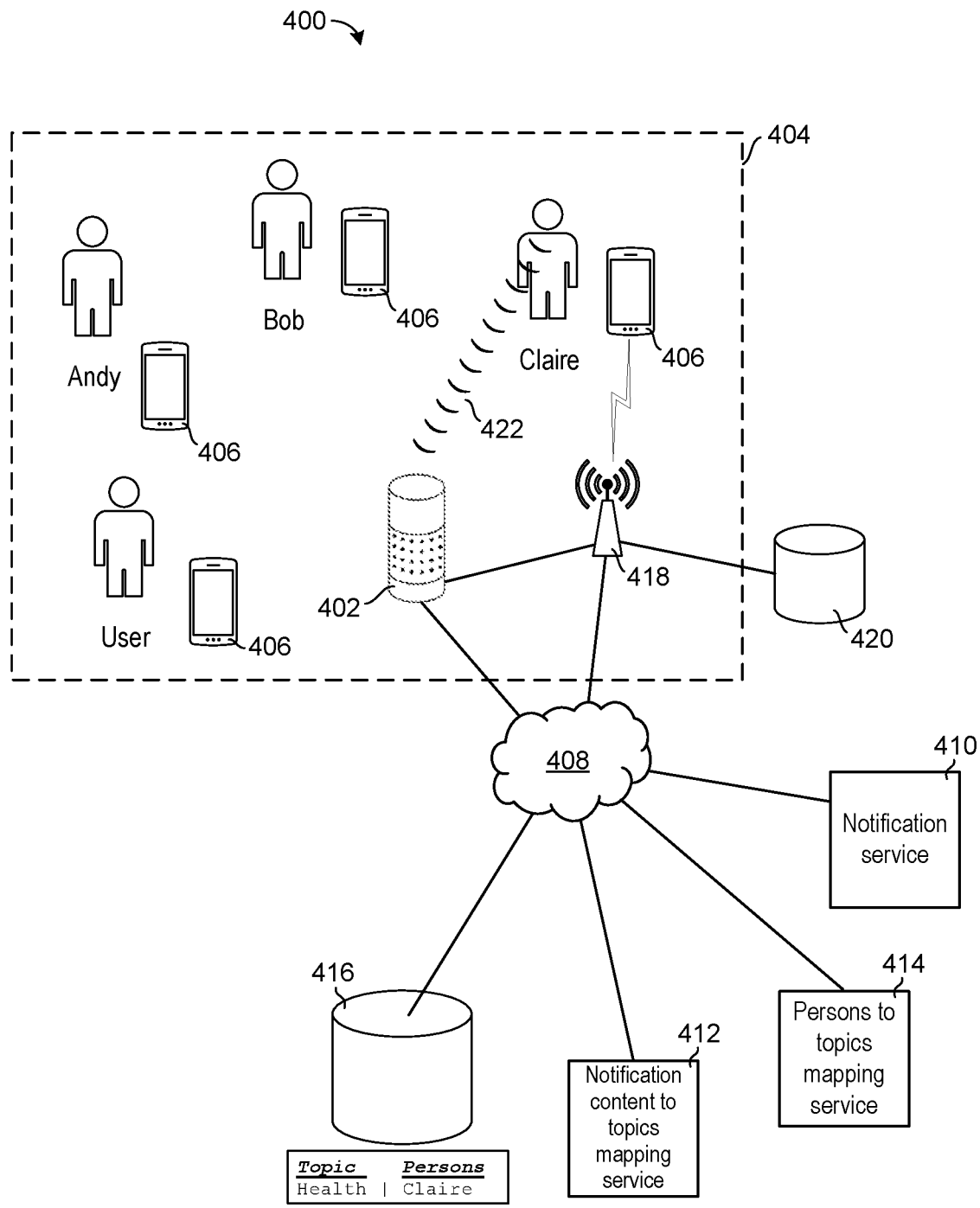
FIG. 4 is a diagram showing an example system comprising a smart speaker according to an embodiment of the present disclosure.

FIG. 4 is a diagram showing an example system 400 comprising an electronic device 402, in the form of a smart speaker, according to an embodiment of the present disclosure. Smart speaker 402 may be in accordance with electronic device 100 of FIG. 1. Several persons, namely User, Andy, Bob, and Claire, are within defined geographic area 404 of smart speaker 402. For simplicity, defined geographic area 404 is referred to as a "room" in this example. Some or all of the persons may each have an electronic device 406 such as a smart phone, tablet, or smart watch.

Smart speaker 402 may be communicatively connected to a network 408. One or more services may be implemented at one or more other electronic devices, such as servers. A notification service 410 may be configured for sending or otherwise notifying smart speaker 402 of a notification to be delivered to the User. As a mere example, notification service 410 may comprise or communicate with a mail server or calendar service (not shown) to receive notifications of new emails, new invitations, and/or reminders for the User. Of course, the notifications may be of any other suitable types.

A notification content to notification topic identifier mapping service 412 may be configured receive a notification, for example from the smart speaker 402 or from the notification service 410, and to then select a notification topic identifier that corresponds to the content of the notification. For example, service 412 may receive a notification from notification service 410 in the form of a reminder of a doctor appointment today at 11:00 AM. Notification content to notification topic identifier mapping service 412 may ascertain from the content of the notification that the notification relates to "Health". This may be accomplished in any suitable way. For instance, service 412 may scan or parse text content of the notification for certain keywords, here such as "doctor", to select an appropriate notification topic identifier. The selection may be done using mappings of terms to notification topic identifier, for example "doctor" maps to the topic identifier "Health". Other mere example topic identifiers are shown in FIGS. 3A and 3B, such as "Work", "Work-secret", "Work-project", "Top Secret" (not necessarily related to work), and "Personal".

A persons to notification topic identifiers service 414 may be configured to generate, store, and/or manage mappings, for example mappings between two or more of persons, notification topic identifiers, and domains. Service 414 may also be configured to receive requests, for example from smart speaker 402, comprising a notification topic identifier and a list of persons in the room 404, determine whether any persons on the list are not authorized to be present to hear the notification based on at least the notification topic identifier and the authorizations or lack thereof of the persons on the list, and send a message to the smart speaker 402 with information indicating whether any unauthorized persons are present and optionally which persons are unauthorized and/or authorized. In the example, the request may include the list of persons present (User, Andy, Bob, Claire) and the notification topic identifier "Health". Service 414 may then perform a lookup in the mapping information and determine that only Claire is mapped to the notification topic identifier "Health". Service 414 may then transmit a message back to smart speaker 402 indicating the findings.

Smart speaker 402 may receive the message from service 414 and determine how to handle the notification (e.g. if, how, and/or when to deliver the notification). In the example, since Andy and Bob are present but not authorized to hear health-related notifications for the User, smart speaker 402 will not audibly output the complete notification immediately. As a mere example, system 400 may be configured to modify the notification before outputting it, similar to the example in FIG. 2C ("You have an appointment at 11:00 am today."). Further, in an example, smart speaker 402 may generate an output signal to the persons located in the room indicating receipt of the notification and that there is at least one person present in the room (here, Andy and Bob) who is not authorized to be present when the notification is to be outputted. Alternatively, system 400 may be configured to handle the presence of unauthorized persons in a different manner, such as those described herein. In another embodiment, the determination of how to handle the notification may be performed somewhere other than at the smart speaker 402, for example at persons to notification topic identifiers service 414.

Figure 5:
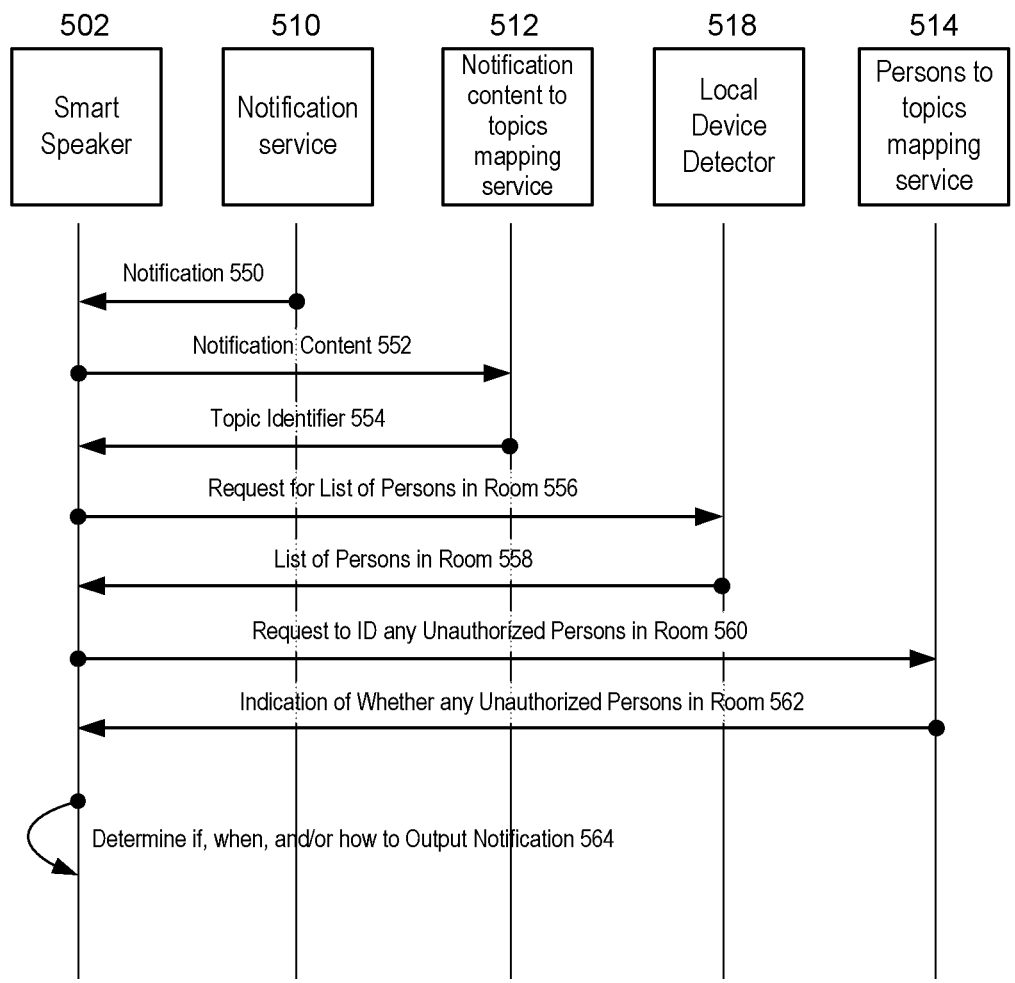
FIG. 5 is a data flow diagram showing possible flows of messages and data between various components of a system according to an embodiment.

FIG. 5 is a data flow diagram showing example flows of messages and data between various components of a system according to an embodiment. Some of these transmissions were described above.

Notification service 510 initially sends or otherwise notifies smart speaker 502 via transmission 550 of a notification to be delivered to the user. The notification may be a notification to be audibly and/or visually outputted in a defined geographic area by smart speaker 502. The smart speaker 502 may also be located within the defined geographic area.

Smart speaker 502 then sends the notification, or at least some of its content, to notification content to topics mapping service 512. Based on the content of the notification, service 512 selects an appropriate notification topic identifier, and sends this to smart speaker 502 via transmission 554.

Smart speaker 502 attempts to determine, if it does not already know, the identities of all persons in the defined geographic area. This may involve sending a request to local device detector 518 via transmission 556. Local device detector 518 may determine all of the persons in the defined geographic area, using one or more suitable techniques, and send this information back to smart speaker 502 via transmission 558.

Smart speaker 502 may then send a request to persons to topic mapping service 514 via transmission 560 to determine whether any of the persons in the defined geographic area are not authorized to be present when the notification is to be outputted. The request may include the list of persons in the area as well as the notification topic identifier. Service 514 may then determine whether any persons on the list are not authorized to be present to hear the notification based on at least the notification topic identifier and the authorizations or lack thereof of the persons on the list. Service 514 may then reply to the smart speaker 502 via transmission 562 with information indicating whether any unauthorized persons are present and optionally which persons are unauthorized and/or authorized.

Smart speaker 502 may then determine how to handle outputting the notification at stage 564, meaning if, when, and/or how to output the notification.

Although not shown in FIG. 5, smart speaker 502 may generate an output signal to the identified persons located in the defined geographic area, indicating receipt of the notification and that there is at least one person present in the defined geographic area who is not authorized to be present when the notification is to be outputted.

It is to be noted that FIG. 5 is only an example and that the number, nature, types, and/or directions of the messages and data between the various components may be different in other embodiments.

Referring again to FIG. 4, in an embodiment, data generated, stored, and/or managed by one or more of services 410, 412, 414, or any other component, may be stored in one or more databases 416. Although only one database is shown, it is to be understood that system 400 may include several databases.

Smart speaker 402, in at least some embodiments, has an ability to learn or at least to become aware of the presence of persons in the room 404. This may be accomplished using one or more techniques. In an embodiment, it may be accomplished based on voice recognition on the persons in the room. For example, a voice 422 spoken in the room may be received at a microphone of smart speaker 402, analyzed and compared to a stored set of associations between persons and voice pattern information. The stored set may be stored in a database, which may be located at smart speaker 402, in database 416, or in any other suitable location. A potential issue with this approach is that smart speaker 402 may not capture the voices of every person in the room 404, perhaps because not every person speaks before a notification arises, or a magnitude of a person's voice is too low to be captured by the smart speaker 402, or multiple persons speak at the same time and it is not possible for the smart speaker 402 to discern specific voices, or there is no entry in the voice to person mapping database for one or more persons in the room.

In an embodiment, smart speaker 402 may ask aloud who is in the room 404. This may be done, for example, initially when the smart speaker 402 wakes up, it may be done periodically, it may be done when a new voice is detected in the room, it may be done when a new voice is detected and there is no match in the voice to person mapping database, and/or it may be done in response to and prior to a notification being outputted.

In an embodiment, the identification of persons in the room may be based on the presence in room 404 of electronic devices 406 associated with those persons.

In particular, system 400 may further include, or have access to, information regarding electronic devices (e.g. devices 406) and associated users (e.g. User, Andy, Bob, Claire) present in the room 404. The devices may be described herein as mobile devices, such as mobile phones, smart phones, tablets, laptops, or the like, but are not necessarily limited to mobile devices. In some cases, the devices may include stationary or fixed computing devices. In this example, system 400 includes a localized device detector 418. The localized device detector 418 may be a standalone system or part of another system or device, such as smart speaker 402, a security system, internal computer network, cellular system, or any other computing system that includes, or has access to, data identifying devices in a geographic area. Such a system may include, for example, a private Wi-Fi™ network capable of identifying mobile devices or stationary devices attached to the network in the coverage area of the Wi-Fi network. In an embodiment, the determining the devices that are located within the room 404 may be based on data from one or more local access points in a wireless network. In some cases, a secure device manager is capable of authenticating devices (e.g. using a certificate) and securely running code on the device to obtain device location information, such as GPS data. In another example, it may include local Bluetooth network or other short-range communication system capable of identifying devices attached to the network in its coverage area. In yet another example, it may include a cellular network capable of identifying mobile devices in communication with one or more base stations in the cellular network in the vicinity of an area of interest. In yet further examples, the computing system may include a system that obtains location data from one or more devices in an area. As an example, some facilities may include wireless location systems that may use a combination of Wi-Fi fingerprinting and GPS location reporting to track the location of devices, in particular mobile devices, within a facility. Devices may be also communicate location data through attachment to a wired network port, e.g. Ethernet port, having a known location. In some examples, the computing system may have pre-stored location data for a device having a fixed location, such as a computing kiosk or other such device. Other such systems for identifying devices within a defined geographic area will be appreciated by those of ordinary skill in the art having regard to these examples and the description that follows.

Localized device detector 418 in this example includes or communicates with a database 420 containing device-user associations. The device-user associations provide information that associates one or more users (i.e. persons) with each device. In some cases, the association is one-to-one. In some cases, a device may be associated with more than one user, or may be associated with a plurality of users belonging to a category or class. The stored set of associations may be a list of device identifiers and, for each device identifier, one or more user identifiers, structured in any suitable data structure.

In an embodiment, device-user association information may be obtained from electronic devices 406 of the persons in the room rather than, or in addition to, from some other location such as database 420. For example, when smart speaker 402 is aware of an electronic device 406 present in the room but does not know the identity of the user associated with that electronic device 406, a request may be sent to the electronic device 406 for the identity of the user. A request may be sent by, for example, smart speaker 402 or localized device detector 418. The user identity information may be stored at electronic device 406, or alternatively may be obtainable by the electronic device 406. In an embodiment, electronic device 406 may send the user identity information to smart speaker 402 without being prompted by a request. In an embodiment, software running on electronic device 406 may provide or otherwise enable these types of functionalities.

Localized device detector 418 may provide information regarding the devices detected in room 404. Room 404 may be of a size suitable for a particular implementation and subject to any resolution limitations of the localized device detector 418.

The information regarding devices detected in room 404, combined with the device-user associations, may provide smart speaker 402 with a set of persons likely to be in the room 404.

In an embodiment, two or more techniques for detecting persons in the room 404 may be used in combination, for example to provide a higher degree of certainty. In other words, one technique may be used to corroborate the findings produced by another technique.

In other embodiments, other techniques for learning which persons are in the room may be used. In some embodiments, multiple techniques may be employed.

Although various components in FIG. 4 are shown as being connected via network 408, this is not limiting. Rather, the ways in which components are shown to be connected are only examples; components may be connected in any other suitable ways. For example, two or more components may configured to communicate directly. Further, although some services are shown as being implemented on devices separate from smart speaker 402, this is not meant to be limiting. In some embodiments, one or more services or other functions may be partly or wholly implemented on smart speaker 402.

Once the smart speaker 402 receives information indicating whether or not there are any persons in the room 404 that are not authorized to be present for the audible notification, the smart speaker 402 may then generate an output signal to the identified one or more persons located within the defined geographic area indicating receipt of the notification and that there is at least one person present in the defined geographic area who is not authorized to be present when the notification is to be outputted.

In response to the signal, the smart speaker 402 may determine how to handle the notification based on this information, meaning the smart speaker 402 may modify the manner in which the notification is to be outputted. If there are no unauthorized persons in the room 404, then the smart speaker 404 may proceed to output the audible notification. If, however, there is at least one person in the room 404 who is not authorized to be present, smart speaker 402 may modify the manner in which the notification is to be outputted. The specific way in which the manner for outputting the notification is modified may be determined by the smart speaker 402 or some other device.

The modifying the manner in which the notification is to be outputted may be based on one or more parameters, such as settings configured for the user in system 400 or smart speaker 402. Settings for the user may dictate the manner in which the notification is to be outputted when there are any unauthorized persons present.

Consider the example of FIG. 2A where the notification to be outputted is "You have an appointment with your dermatologist at 11:00 am today".

The modifying the manner in which the notification is to be outputted may involve simply not audibly outputting the notification at all, or alternatively postponing in time the outputting of the notification. Postponing the outputting may be done for a predetermined amount of time, for example, outputting the notification in 15 minutes. Alternatively, the outputting may be postponed for a predetermined amount of time and then a further check to see if there are still any unauthorized persons in the room may be performed. If there are no longer any unauthorized persons present, the notification may be outputted. Alternatively, checks for the presence of any unauthorized persons may be conducted periodically. As soon as a check determines that no unauthorized persons are present, the notification may be outputted.

Further, the modifying the manner in which the notification is to be outputted may involve modifying the content of the notification, and outputting the modified notification. Modifying the content of the notification may comprise removing some details from the notification to, for instance, generalize the notification. For example, modifications to the above message could be "You have an appointment at 11:00 am today" or simply "You have a new notification". Further, modifying the content of the notification may involve outputting an indication that the notification will not be outputted due to there being at least one unauthorized person present in the defined geographic area. Further, modifying the content of the notification may involve outputting an audible notification identifying the specific person(s) as unauthorized, and/or a request that the unauthorized person(s) leave the defined geographic area.

Figure 6:
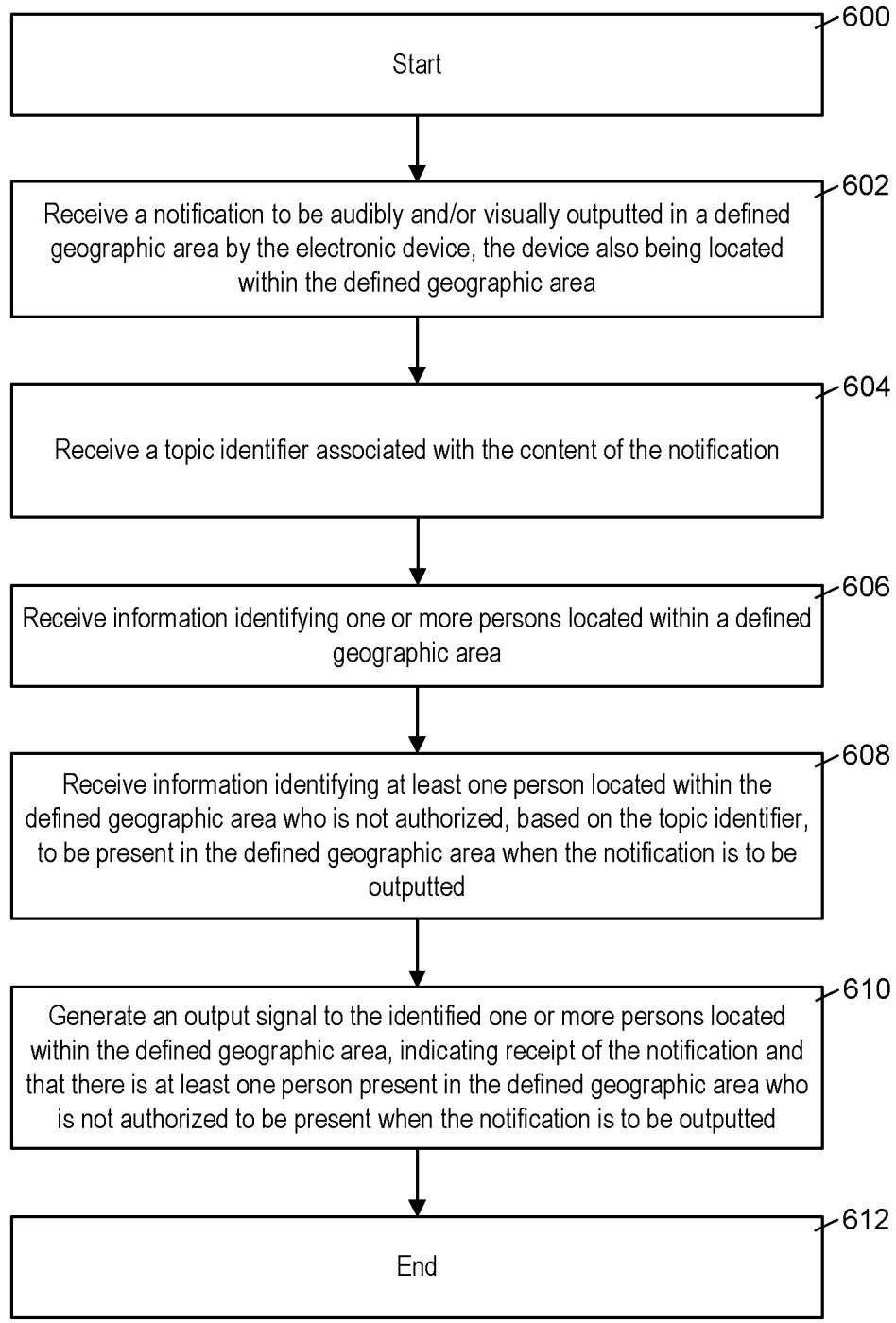
FIG. 6 is an example process flow diagram according to the present disclosure.

FIG. 6 is an example process flow diagram according to the present disclosure. The process starts at block 600 and proceeds to block 602 where the electronic device receives a notification to be audibly and/or visually outputted in a defined geographic area by the electronic device, the device also being located within the defined geographic area.

The process proceeds to block 604 where the electronic device receives a topic identifier associated with the content of the notification.

The process proceeds to block 606 where information identifying one or more persons located within the defined geographic area is received.

The process proceeds to block 608 where the electronic device receives information identifying at least one person located within the defined geographic area who is not authorized, based on the topic identifier, to be present in the defined geographic area when the notification is to be outputted.

The process proceeds to block 610 where an output signal is generated to the identified one or more persons located within the defined geographic area indicating receipt of the notification and that there is at least one person present in the defined geographic area who is not authorized to be present when the notification is to be outputted.

Optionally, in response to the output signal indicating that there is at least one person present in the defined geographic area who is not authorized to be present when the notification is to be outputted, the manner in which the notification is to be outputted may be modified. Optionally, the notification may be outputted from the electronic device.

The process then proceeds to block 612 and ends.

According to another aspect, the present disclosure generally relates to methods and devices for detecting persons that are not authorized to be present during an event, such as a meeting.

Figure 7:
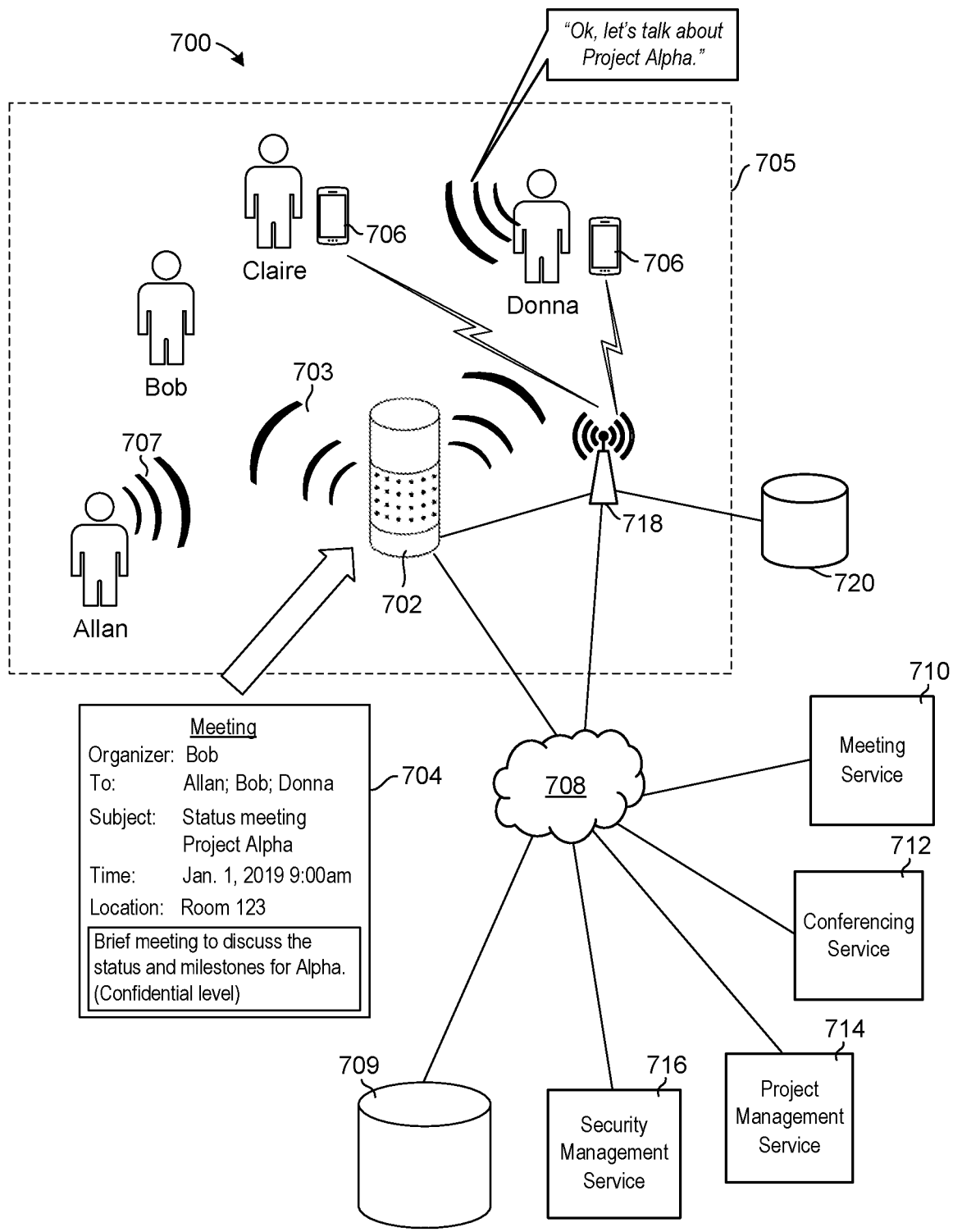
FIG. 7 is a diagram of an example scenario with a system comprising a smart speaker according to an embodiment of the present disclosure.

FIG. 7 is a diagram showing an example scenario with an example system 700 comprising an electronic device 702, in the form of a smart speaker, according to an embodiment of the present disclosure. Four persons, Allan, Bob, Claire, and Donna, are physically present in the vicinity of a smart speaker 702. For example, the persons may be gathered in a meeting room for a scheduled meeting. There may be other persons located remotely that are participating in the meeting, for example via conference call or other suitable technology, which may be facilitated by smart speaker 702. One or more persons may have an electronic device 706, such as a smart phone, tablet, or smart watch.

It is noted that while embodiments described herein involve events in the form of meetings, and electronic devices in the form of smart speakers, these are merely examples and thus neither is intended to be limiting. The teachings of the present disclosure contemplate and apply to types of events at or proximate a smart speaker (or other device) other than meetings, and to electronic devices other than smart speakers. Other example types of events include but are not limited to presentations, conferences, briefings, and interviews. Further, while at least some of the embodiments described herein, including FIG. 7, include or refer to projects, this is merely an example and thus is not intended to be limiting. The teachings of the present disclosure contemplate and apply to other types of groupings of people other than projects, including but not limited to groups, departments, and teams.

Smart speaker 702 may be in accordance with electronic device 100 of FIG. 1 and may include a loudspeaker and a microphone for outputting and receiving, respectively, audible signals 703, 707.

Smart speaker 702 may determine the topic of the meeting in some manner. For example, the meeting may relate to a particular project "Alpha" in the organization. Project "Alpha" may be the topic identifier or project identifier of the project. In an example, smart speaker 702 may determine that the meeting is associated with the topic identifier based on identifying content associated with the meeting in a communication.

In an embodiment, the communication may be an electronic meeting invitation or an electronic message. For example, FIG. 7 shows an electronic meeting invitation 704 to the meeting addressed to Allan, Bob, and Donna. In another embodiment, invitation 704 may be addressed to a mailing group, for example "Project Alpha", which comprises the email or contact addresses of Allan, Bob, and Donna.

FIG. 8, which is merely an example, is a representation of a data structure, here a table, containing mapping information of the persons shown in FIG. 7 to the projects the persons are on, and also to their security clearance levels. Such mapping information may be stored in any suitable location, such as a database of smart speaker 702 or in a remote database 709. The recipients of electronic meeting invitation 704 are Allan, Bob, and Donna, but not Claire. Thus Claire is not a recipient of invitation 704 and thus was not invited to the meeting. Smart speaker 702 may receive a copy of the invitation 704 or may just receive information from or based on invitation 704, which may be used to determine a project to which the meeting pertains. In this example, the project is Alpha and the topic identifier is simply "Alpha".

The topic identifier may be determined based on any number of suitable ways from information in invitation 704. For example, the topic identifier may be determined based on the subject or description of the meeting, here "Status meeting Project Alpha", or based on some other field or information in invitation 704. In an embodiment, the topic identifier may be determined based on the recipients of the electronic meeting invitation 704. The topic identifier may be determined based on the combination of recipients, for example identifying that the list of persons invited corresponds to a list of persons on a particular project. In this example, it may be deduced from information in the table of FIG. 8 that the meeting relates to project Alpha since Allan, Bob, and Donna are all on this project despite Claire not being on the project.

In an embodiment, the communication may be a verbal communication spoken by a person in the vicinity of smart speaker 702. For example, FIG. 7 shows a person present at the meeting, Donna, saying aloud "Ok, let's talk about Project Alpha." Smart speaker 702 may receive this spoken content, for example via a microphone, and search, parse or otherwise analyze the content for any terms, phrases, or other keywords that may be used to identify a topic identifier. Such information may be used to query a database of terms that are associated with particular projects. In the example of FIG. 7, the spoken content contains the topic identifier itself.

In an embodiment, the topic identifier may be determined based a combination of techniques or approaches. In other embodiments, the topic identifier may be determined in any other suitable way. In an embodiment, the topic identifier may be determined somewhere other than at smart speaker 702 and the topic identifier may be merely sent to smart speaker 702.

Once a topic identifier is determined, smart speaker 702 may determine whether one or more persons known to be present at the meeting are not authorized to be present. The manner in which smart speaker 702 may determine or learn which persons are present in its vicinity is described further below. At this point in describing this example, it is assumed that smart speaker 702 already knows that Allan, Bob, Claire, and Donna are present. Determining if one or more persons is not authorized to be present may be done based on the information in the table of FIG. 8, for example by looking-up persons who are present and determining if they are on the project associated with the topic identifier.

For example, a database containing the table of FIG. 8 may be queried with the names Allan, Bob, Claire, and Donna, and the topic identifier Alpha. The database may return positive indications for Allan, Bob, and Donna, and a negative indication for Claire. Based on the results of the database query, the smart speaker 702 determines that Claire is not authorized to be present during the meeting relating to project Alpha.

In another embodiment, alternatively or in addition to basing the determination on the information in the table of FIG. 8, the determination of whether persons are authorized to be present may be based on the list of persons invited to the meeting in invitation 704. In this example, Allan, Bob, and Donna were recipients of invitation 704, and thus may be considered to be authorized to attend the meeting. In contrast, Claire was not a recipient of invitation 704, thus Claire may be considered to not be authorized to be present.

Smart speaker 702 may then generate an output signal indicating the unauthorized presence of a person, Donna, at the meeting.

Smart speaker 702 may be configured to trigger, in response to the output signal, an alarm indicating the unauthorized presence of one or more persons. In an embodiment, smart speaker 702 is configured to generate, in response to the output signal, an audible and/or visual notification (or any other type of output, such as tactile, broadcast, etc.) of the unauthorized presence of the person to be outputted via a loudspeaker and/or electronic display of smart speaker 702 or of another device. For example, an audible notification may be "An unauthorized person is present". In an embodiment, the audible notification may identify the identity of the person(s) not authorized to be present, for example by name: "Claire is not authorized to be present for this meeting". In an embodiment, the triggering of an alarm may include sending a notification to another electronic device, for example to a smart phone or other computer, and/or causing the audible and/or visual output of an alarm or notification at another device.

Smart speaker may be configured to determine, based on the topic identifier, whether every person known to be present at the meeting is either authorized or not authorized to be present during the meeting. An audible and/or visual notification of the unauthorized presence may identify some or all of the persons not authorized to be present.

In an embodiment, alternatively or additionally to determining that a person is authorized to be present during a meeting based on whether the person is on the project associated with the topic identifier, the determination may be made based on whether the person fulfils one or more other requirements, such as having at least a security clearance level associated with the project. FIG. 9 is a representation of an example data structure in the form of a table showing example mappings or associations between projects and security clearance levels. Such mapping information may be stored in any suitable location, such as a database of smart speaker 702 or in a remote database 709. For example, project Alpha may be assigned a security clearance level of "confidential". Example security clearance levels may be, in increasing order, confidential, secret, top secret.

In an embodiment, if the person does not have the security clearance level associated with the project, then the person may be considered not authorized to be present during the meeting. The security clearance level of a person may be stored electronically in any suitable location, for example in a database 709 or locally at the smart speaker 702. In an embodiment, the person's security clearance level may be stored in a stored security profile.

The type or format of a notification, such as an audible and/or visual notification, generated by smart speaker 702 in response to determining that the presence of at least one person at the meeting is not authorized may be proportional to the security clearance level associated with the topic identifier. For example, a meeting with a top secret security clearance level may trigger a notification having a format that differs from a notification format for a meeting with a lower security clearance level or no security clearance level at all. The format of a notification for a meeting with a higher security clearance level may be more severe than the format for a lower security clearance level meeting. The format of a notification may relate to, for example, at least one of the magnitude, duration, and frequency of the notification.

As an example, the notification format for a meeting with a lower security clearance level may comprise of a single notification, whereas the notification format for a meeting with a higher security clearance level may comprise multiple notifications (e.g. several per minute), and/or an audible alarm that must be manually disabled, and/or a louder audible notification, and/or more frequent audible notifications, and/or longer audible notifications.

In an embodiment, a table or other data structure, such as the one of FIG. 8, may be automatically constructed and/or populated based on some of the techniques described herein, including those mentioned above. For example, assume the system did not know that one or more of Allan, Bob, and Donna were on project Alpha. It may be deduced from information in invitation 704 that the meeting relates to project Alpha, for example since the subject field is "Project Alpha" and/or the body of the invitation mentions "Alpha", and further deduced that all of Allan, Bob, and Donna are all on project Alpha since they were invited to the meeting. This type of information may be used to automatically populate a data structure. Of course, here Claire is present but is actually not on project Alpha. Other features of the system may prevent or reduce the risk of persons being added to projects that they are not actually on. In another embodiment, the information may be deduced based on information contained in emails or other messages between persons.

In another example, assume the system did not know the security clearance levels of one or more of Allan, Bob, and Donna. It may be deduced from information in invitation 704 that the meeting relates to project Alpha, as described above, and further that the security clearance level associated with project Alpha is "confidential" (e.g. if this not already known by the system) since the body of the invitation mentions "confidential level". It may be further deduced that all of Allan, Bob, and Donna have at least a security clearance level of "confidential" since they were all invited to the meeting. This type of information may be used to automatically populate a data structure.

Alternatively or additionally, in an embodiment, such data structures may be manually populated and administered, for example by system administrators.

As mentioned above, smart speaker 702 may determine whether one or more persons known to be present at the meeting are not authorized to be present. Now, techniques for determining the presence of persons at the meeting are described.

Smart speaker 702, in at least some embodiments, has an ability to learn or at least to become aware of the presence of persons in its vicinity. This may be accomplished using one or more techniques.

In an embodiment, the determining or identifying the presence of a person may be based on detecting a presence of an electronic device in the vicinity of the electronic device. The electronic device may be associated with the person. For instance, in the example of FIG. 7, the presence of Claire and/or Donna may be detected based on the presence of electronic devices 706, in the form of smart phones, associated with Claire and Donna, respectively. In another example, the presence of an electronic device may be detected but it may not be possible to determine any person associated with the device. In such a scenario, the presence of the electronic device may be considered as an unauthorized presence of a person since it is not possible to determine whether a person who accompanies the device is authorized or not to be present.

Smart speaker 702 may have, or have access to, information relating to the identification of electronic devices 706 that are present in the vicinity of smart speaker 702. Further, smart speaker 702 may have, or have access to, information relating to the identification of persons to which the electronic devices 706 are registered or otherwise associated.

In an embodiment, the presence of electronic devices 706 in the vicinity of smart speaker 702 may be detected based on the use of a localized device detector 718. Localized device detector 718 may be a standalone system or device as shown FIG. 7, or it may be part of smart speaker 702. In other embodiments, localized device detector 718 may be part of another system or device, such as a security system, computer network, cellular system, or any other computing system that includes, or has access to, data identifying devices in a geographic area. Such a system may include, for example, a private W-Fi network capable of identifying mobile devices or stationary devices attached to the network in the coverage area of the W-Fi network.

Detecting the presence of electronic devices 706 may be based on data from one or more local access points in a wireless network. In the embodiment of FIG. 7, localized device detector 718 is shown as being implemented as, or integrated with, such a local access point. In some embodiments, a secure device manager is capable of authenticating electronic devices 706 or other devices (e.g. using a certificate) and securely running code on the device to obtain device location information, such as GPS data. In another example, it may include local Bluetooth network or other short-range communication system capable of identifying electronic devices 706 or other devices attached to the network in its coverage area. In yet another example, it may include a cellular network capable of identifying electronic devices 706, mobile devices, or other devices in communication with one or more base stations in the cellular network in the vicinity of an area of interest. In yet further examples, localized device detector 718 may include a system that obtains location data from one or more devices in an area.

As an example, some facilities may include wireless location systems that may use a combination of W-Fi fingerprinting and GPS location reporting to track the location of devices, in particular mobile devices, within a facility. Devices may be also communicate location data through attachment to a wired network port, e.g. Ethernet port, having a known location. In some examples, localized device detector 718 may have pre-stored location data for a device having a fixed location, such as a computing kiosk or other such device. Other such devices and/or systems for identifying devices within a defined geographic area will be appreciated by those of ordinary skill in the art.

Again referring to FIG. 7, localized device detector 718 in this embodiment includes or communicates with a database, such as database 720, containing device-user associations, such as registrations. The device-user associations provide information that associates one or more users (persons) with each device, for example electronic devices 706. In some cases, the association is one-to-one. In some cases, a device may be associated with more than one user, or may be associated with a plurality of users belonging to a category or class. The stored set of associations may be a list of device identifiers and, for each device identifier, one or more user identifiers, structured in any suitable data structure.

In an embodiment, device-user association information may be obtained from electronic devices 706 of the persons in the vicinity rather than, or in addition to, from some other location such as database 720. For example, when smart speaker 702 is aware of an electronic device 706 present in the room but does not know the identity of the user associated with that electronic device 706, a request may be sent to the electronic device 706 for the identity of the user. A request may be sent by, for example, smart speaker 702 or localized device detector 718. The user identity information may be stored at electronic device 706, or alternatively may be obtainable by the electronic device 706. In an embodiment, electronic device 706 may send the user identity information to smart speaker 702 without being prompted by a request. In an embodiment, software running on electronic device 706 may provide or otherwise enable these types of functionalities.

Localized device detector 718 may provide information regarding the detected physical presence of devices, for example in a vicinity of smart speaker 702. The vicinity may consist or comprise of a defined geographic area 705. Defined geographic area 705 may be defined to correspond to the confines of a room or any other suitable area, and may be subject to any resolution and/or range limitations of the localized device detector 718 and/or smart speaker 702.

In an embodiment, two or more techniques for detecting devices present in the vicinity of smart speaker 702 may be used in combination, for example to provide a higher degree of certainty. In other words, one technique may be used to corroborate the findings produced by another technique. In other embodiments, other techniques for learning which persons are present may be used.

In an embodiment, the determining or identifying the presence of persons may be accomplished based on voice detection and/or voice recognition on persons in the vicinity of smart speaker 702. Smart speaker 702 may be awake and simply "listen" to persons speaking nearby. The presence of a person may be detected based on comparing voices received at smart speaker 702. For example, the presence of a person may be detected by detecting a new voice. Content spoken aloud 707 may be received at a microphone of smart speaker 702, analyzed and compared to a stored set of associations between persons and voice pattern information.

The analysis may comprise voice recognition analysis. The stored set may be stored in a database, which may be located at smart speaker 702, in database 709, or in any other suitable location.

In an embodiment, smart speaker 702 may ask aloud who is present. This may be done, for example, initially when the smart speaker 702 wakes up, it may be done prior to or at the start of a meeting, it may be done periodically, it may be done when a new voice is detected, it may be done when a new voice is detected and there is no match in the voice to person mapping database, and/or it may be done in response to and prior to a notification being outputted. Responses of persons present may be received by smart speaker 702 and analyzed. The analysis may take into account both the voice pattern of the spoken response and/or the content of the response, for example the person's name.

The voice analysis mentioned above may be performed partly or wholly at smart speaker 702, or may be performed partly or wholly remotely, for example at one or more of services 710, 712, 714, 716, or at another device (not shown).

In an embodiment, a camera may be used to capture images of the vicinity of the smart speaker 702. The images may be used to count the number of persons in the vicinity, and/or may be used to detect any unidentified persons. For instance, if the smart speaker 702 has identified five persons in a room, but it is determined from the images that there are actually 6 persons in the room, the smart speaker 702 may trigger an action to obtain the unknown person's identity.

In an embodiment, a badge reader or similar device located at the entrance of a room where a meeting is being held may obtain information identifying persons entering the room.

In an embodiment, one or more biometric sensors at the smart speaker 702, or otherwise in communication with smart speaker 702, may obtain information that may be used to identify persons in the vicinity. Such an example involving a microphone and voice recognition was described above. Other suitable biometric sensors, such as fingerprint sensors, and iris sensors, may be used.

Smart speaker 702 may be communicatively connected to one or more other devices via a network 708. System 700 may comprise a distributed system where, for example, one or more client devices access, via network 708 or other communication links, services hosted at one or more server devices. At least some of these services may be referred to as cloud-based services.

A meeting service 710 may be configured to perform tasks related to meetings, for example facilitating meetings, and may communicate with smart speaker 702 for this purpose. As a mere example, meeting service 710 may comprise or communicate with a mail server or calendar service (not shown) to receive notifications or other information relating to meeting schedules, meeting invitations, and any other suitable information. Further, meeting service 710 may provide additional functions such as managing meeting schedules, sending and managing meeting invitations and reminders, managing lists of invitees and/or participants, room bookings, and language translation services for call content.

A conferencing service 712 may provide audio and/or video calling or conferencing capabilities. Conferencing service 712 may communicate with smart speaker 702 as well as meeting service 710 for facilitating meetings with conferencing capabilities.

A project management service 714 may provide capabilities relating to projects, including those described herein. These may include but are not limited to managing the creation of projects, assigning topic identifiers to projects, assigning security clearance levels to projects, adding/removing persons to projects.

A security management service 716 may provide capabilities relating to securing projects and other data. These may include but are not limited to managing security clearance levels assigned projects and/or persons, including those described herein.

It is noted that services 710, 712, 714, 716 are merely examples of services and/or systems that may be part of or communicate with system 700. For example, smart speaker 702 may communicate with and/or function in conjunction with other services, servers, and/or devices.

In an embodiment, data generated, stored, and/or managed by one or more of services 710, 712, 714, 716, and/or any other component, may be stored in one or more databases 709. Although a specific number of databases are shown, it is to be understood that system 700 may include any suitable number of databases.

Although various components in FIG. 7 are shown as being connected via network 708, this is not limiting. Rather, the ways in which components are shown to be connected are only examples; components may be connected in any other suitable ways. For example, two or more components may configured to communicate directly. Further, although some services are shown as being implemented on devices separate from smart speaker 702, this is not meant to be limiting. In some embodiments, one or more services or other functions may be partly or wholly implemented on smart speaker 702.

Figure 10:
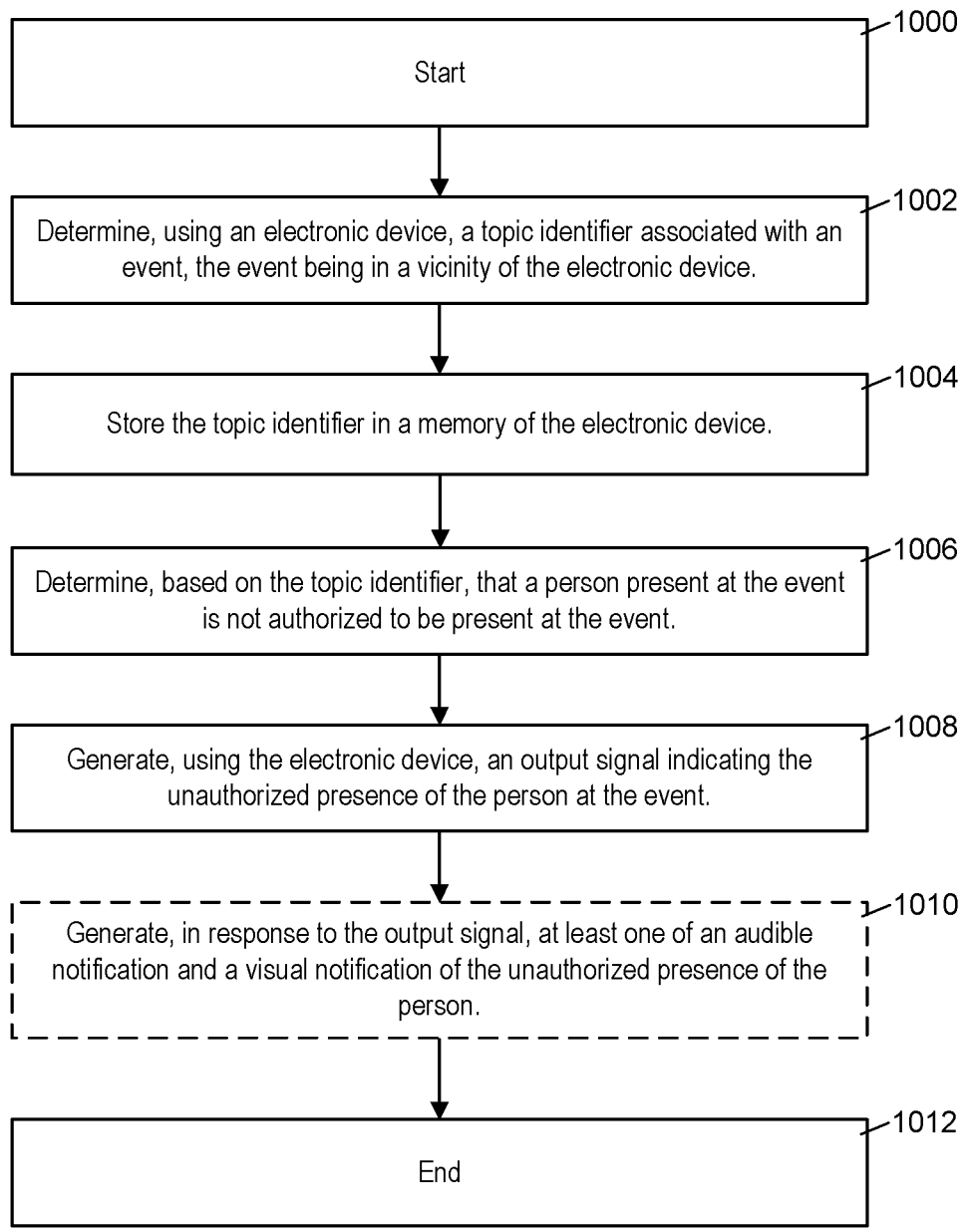
FIG. 10 is an example process flow diagram according to the present disclosure.

FIG. 10 is an example process flow diagram according to the present disclosure.

The process starts at block 1000 and proceeds to block 1002 where it is determined, using an electronic device, a topic identifier associated with an event, the event being in a vicinity of the electronic device.

The process proceeds to block 1004 where the topic identifier is stored in a memory of the electronic device.

The process proceeds to block 1006 where it is determined, based on the topic identifier, that a person present at the event is not authorized to be present at the event.

The process proceeds to block 1008 where an output signal is generated, using the electronic device, indicating the unauthorized presence of the person at the event.

The process proceeds to block 1010, where optionally, at least one of an audible notification and a visual notification of the unauthorized presence of the person is generated in response to the output signal.

The process proceeds to block 1012 and ends.

The term vicinity is used herein to refer to the physical or geographic area or region near or about a place or thing. In an embodiment, the term may be used to refer to a defined geographic area, for example the boundaries of a room or other space, or a specific range or distance.

At least some embodiments described herein relate to or include a smart speaker and/or audible notifications. However, the scope of the present disclosure is not intended to be limited to embodiments involving only smart speakers and/or audible notifications. The teachings according to the present disclosure may be used or applied in or with other types of electronic devices and/or other forms of notifications (e.g. visual, tactile, etc.), and/or in other applications and/or in other fields.

The teachings according to the present disclosure may be implemented at or performed by any suitable network element or combination of network elements. A network element may be a network side electronic device, such as a server, or a user side electronic device, such as a smart speaker, mobile device, or other electronic device. These network side and user side devices are only examples and are not intended to be limiting.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not necessarily provided as to whether the embodiments described herein are implemented as a computer software, computer hardware, electronic hardware, or a combination thereof.

Embodiments of the disclosure may be represented as a computer program product stored in a machine-readable medium (also referred to as a computer-readable medium, a processor-readable medium, or a computer usable medium having a computer-readable program code embodied therein). The machine-readable medium may be any suitable tangible, non-transitory medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations may also be stored on the machine-readable medium. The instructions stored on the machine-readable medium may be executed by a processor or other suitable processing device, and may interface with circuitry to perform the described tasks.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

In addition, the steps and the ordering of the steps of methods described herein are not meant to be limiting. Methods comprising different steps, different number of steps, and/or different ordering of steps are also contemplated. Furthermore, although some steps are shown as being performed consecutively or concurrently, in other embodiments these steps may be performed concurrently or consecutively, respectively.

For simplicity and clarity of illustration, reference numerals may have been repeated among the figures to indicate corresponding or analogous elements. Numerous details have been set forth to provide an understanding of the embodiments described herein. The embodiments may be practiced without these details. In other instances, well-known methods, procedures, and components have not been described in detail to avoid obscuring the embodiments described.

The above-described embodiments are intended to be examples only. Alterations, modifications and variations may be effected to the particular embodiments by those of skill in the art without departing from the scope, which is defined solely by the claims appended hereto.

The following clauses describe further aspects according to the present disclosure.

1. An electronic device comprising: a memory storing computer-executable instructions; and a processor in communication with the memory, the processor configured to execute the computer-executable instructions to: determine a topic identifier associated with an event, the event being in a vicinity of the electronic device; store the topic identifier in the memory; determine, based on the topic identifier, that a person present at the event is not authorized to be present at the event; and generate an output signal indicating the unauthorized presence of the person at the event.

2. The electronic device according to clause 1, further configured to generate, in response to the output signal, at least one of an audible notification and a visual notification of the unauthorized presence of the person.

3. The electronic device according to clause 2, wherein the notification identifies the person not authorized to be present.

4. The electronic device according to clause 1, wherein the processor is further configured to: identify the presence of the person in the vicinity of the electronic device at the event based on detecting a presence of a second electronic device, associated with the person, in the vicinity of the electronic device.

5. The electronic device according to clause 1, wherein the processor is further configured to: receive content spoken aloud by the person; and identify the presence of the person in the vicinity of the electronic device at the event based on the received spoken content.

6. The electronic device according to clause 1, wherein the determining that the event is associated with the topic identifier is based on identifying content associated with the event in a communication.

7. The electronic device according to clause 6, wherein the communication is at least one of a verbal communication spoken by a person in the vicinity of the electronic device, an electronic event invitation, and an electronic message.

8. The electronic device according to clause 1, wherein the determining that the person present is unauthorized is based on stored mapping information between the topic identifier and persons associated with the topic identifier.

9. The electronic device according to clause 1, wherein the determining that the person present is unauthorized is based on a stored security clearance level assigned to the topic identifier and based on the person not having the assigned security clearance level in a stored security profile.

10. A method for detecting, using an electronic device, an unauthorized presence of a person at an event, the method comprising: determining, using the electronic device, a topic identifier associated with the event, the event being in a vicinity of the electronic device; storing the topic identifier in a memory of the electronic device; determining, based on the topic identifier, that the person present at the event is not authorized to be present at the event; and generating, using the electronic device, an output signal indicating the unauthorized presence of the person at the event.

11. The method of clause 10, further comprising generating, in response to the output signal, at least one of an audible notification and a visual notification of the unauthorized presence of the person.

12. The method of clause 11, wherein the notification identifies the person not authorized to be present.

13. The method of clause 10, further comprising identifying the presence of the person in the vicinity of the electronic device at the event based on detecting a presence of a second electronic device, associated with the person, in the vicinity of the electronic device.

14. The method of clause 10, further comprising: receiving content spoken aloud by the person; and identifying the presence of the person in the vicinity of the electronic device at the event based on the received spoken content.

15. The method of clause 10, wherein the determining that the event is associated with the topic identifier is based on identifying content associated with the event in a communication.

16. The method of clause 15, wherein the communication is at least one of a verbal communication spoken by a person in the vicinity of the electronic device, an electronic event invitation, and an electronic message.

17. The method of clause 10, wherein the determining that the person present is unauthorized is based on stored mapping information between the topic identifier and persons associated with the topic identifier.

18. The method of clause 10, wherein the determining that the person present is unauthorized is based on a stored security clearance level assigned to the topic identifier and based on the person not having the assigned security clearance level in a stored security profile.

19. A non-transitory computer-readable medium having computer-readable instructions stored thereon, the computer-readable instructions executable by at least one processor of an electronic device to cause the performance of the operations in accordance with clause 10.

The invention claimed is:

1. An electronic device comprising:
a memory storing computer-executable instructions; and
a processor in communication with the memory, and configured to execute the computer-executable instructions to:
receive a notification to be audibly and/or visually outputted in a defined geographic area by the electronic device, the device also being located within the defined geographic area;
receive a topic identifier associated with the content of the notification;
receive information identifying one or more persons located within the defined geographic area;
receive information identifying at least one person located within the defined geographic area who is not authorized, based on the topic identifier, to be present in the defined geographic area when the notification is to be outputted; and
generate an output signal to the identified one or more persons located within the defined geographic area indicating receipt of the notification and that there is at least one person present in the defined geographic area who is not authorized to be present when the notification is to be outputted.

2. The electronic device of claim 1, wherein the processor is further configured to, in response to the output signal indicating that there is at least one person present in the defined geographic area who is not authorized to be present when the notification is to be outputted, modify the manner in which the notification is to be outputted.

3. The electronic device of claim 2, wherein the modifying involves postponing in time the outputting of the notification.

4. The electronic device of claim 2, wherein the modifying involves postponing any outputting of the notification, and outputting the notification at a later time when it is determined that there are no persons present in the defined geographic area who are not authorized to be present.

5. The electronic device of claim 2, wherein the modifying involves modifying the content of the notification, and outputting the modified notification.

6. The electronic device of claim 1, wherein the received topic identifier is based on a mapping of text content in the notification to a list of topic identifiers.

7. The electronic device of claim 1, wherein the received information identifying the at least one person located within the defined geographic area who is not authorized to be present is based on a mapping of persons to authorized and/or unauthorized topic identifiers.

8. The electronic device of claim 1, further comprising:
a microphone,
wherein the processor is further configured to execute computer-executable instructions to:
receive a voice signal of a person via the microphone;
receive, from a stored set of associations between persons and voice pattern information, information identifying the person based on the received voice signal,
wherein the received information identifying the one or more persons located within the defined geographic area includes the information identifying the person based on the received voice signal.

9. The electronic device of claim 1, wherein the processor is further configured to execute computer-executable instructions to:
obtain device information related to one or more devices located within the defined geographic area; and
obtain, from a stored set of associations between persons and devices, information identifying one or more persons associated with the devices located in the defined geographic area based on the device information,
wherein the received information identifying the one or more persons located within the defined geographic area includes the information identifying the one or more persons based on the device information.

10. A method of selectively outputting a notification, from an electronic device, the method comprising:
receiving the notification to be audibly and/or visually outputted in a defined geographic area by the electronic device, the device also being located within the defined geographic area;
receiving a topic identifier associated with the content of the notification;
receiving information identifying one or more persons located within the defined geographic area;
receiving information identifying at least one person located within the defined geographic area who is not authorized, based on the topic identifier, to be present in the defined geographic area when the notification is to be outputted; and
generating an output signal to the identified one or more persons located within the defined geographic area indicating receipt of the notification and that there is at least one person present in the defined geographic area who is not authorized to be present when the notification is to be outputted.

11. The method of claim 10, further comprising, in response to the output signal indicating that there is at least one person present in the defined geographic area who is not authorized to be present when the notification is to be outputted, modifying the manner in which the notification is to be outputted.

12. The method of claim 11, wherein the modifying involves postponing in time the outputting of the notification.

13. The method of claim 11, wherein the modifying involves postponing any outputting of the notification, and outputting the notification at a later time when it is determined that there are no persons present in the defined geographic area who are not authorized to be present.

14. The method of claim 11, wherein the modifying involves modifying the content of the notification, and outputting the modified notification.

15. The method of claim 10, wherein the received topic identifier is based on a mapping of text content in the notification to a list of topic identifiers.

16. The method of claim 10, wherein the received information identifying the at least one person located within the defined geographic area who is not authorized to be present is based on a mapping of persons to authorized and/or unauthorized topic identifiers.

17. The method of claim 10, further comprising:

receiving a voice signal of a person via a microphone; and receiving, from a stored set of associations between persons and voice pattern information, information identifying the person based on the received voice signal, wherein the received information identifying the one or more persons located within the defined geographic area includes the information identifying the person based on the received voice signal.

18. The method of claim 10, further comprising:

obtaining device information related to one or more devices located within the defined geographic area; and obtaining, from a stored set of associations between persons and devices, information identifying one or more persons associated with the devices located in the defined geographic area based on the device information, wherein the received information identifying the one or more persons located within the defined geographic area includes the information identifying the one or more persons based on the device information.

19. A non-transitory computer-readable medium having computer-readable instructions stored thereon, the computer-readable instructions executable by at least one processor of an electronic device to cause the performance of the operations in accordance with claim 10.

* * * * *